United States Patent
Mula et al.

(10) Patent No.: US 11,425,230 B2
(45) Date of Patent: Aug. 23, 2022

(54) EFFICIENT PARSING TUNED TO PREVALENT PACKET TYPES

(71) Applicant: Mellanox Technologies, Ltd., Yokneam (IL)

(72) Inventors: Liron Mula, Ramat Gan (IL); Aviv Kfir, Nili (IL); Amir Mizrahi, Porat (IL); Niv Aibester, Herzliya (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 68 days.

(21) Appl. No.: 17/160,407

(22) Filed: Jan. 28, 2021

(65) Prior Publication Data

US 2022/0239766 A1 Jul. 28, 2022

(51) Int. Cl.
*H04L 49/354* (2022.01)
*H04L 49/90* (2022.01)
*H04L 69/22* (2022.01)
*H04L 69/12* (2022.01)

(52) U.S. Cl.
CPC ............ *H04L 69/22* (2013.01); *H04L 49/354* (2013.01); *H04L 49/90* (2013.01); *H04L 69/12* (2013.01)

(58) Field of Classification Search
None
See application file for complete search history.

(56) References Cited

U.S. PATENT DOCUMENTS

| | | |
|---|---|---|
| 5,394,394 A | 2/1995 | Crowther et al. |
| 6,308,219 B1 | 10/2001 | Hughes |
| 6,356,951 B1 | 3/2002 | Gentry, Jr. |
| 6,504,842 B1 | 1/2003 | Bergenfeld |
| 6,788,680 B1 | 9/2004 | Perlman et al. |
| 6,807,172 B1 | 10/2004 | Levenson et al. |
| 7,333,484 B2 | 2/2008 | Henderson et al. |
| 7,623,468 B2 | 11/2009 | Panigrahy et al. |
| 7,921,046 B2 | 4/2011 | Parsons et al. |
| 8,161,468 B2 | 4/2012 | Todd |
| 8,694,448 B2 | 4/2014 | Mandelbaum et al. |
| 8,705,533 B1 | 4/2014 | Venkatraman et al. |
| 9,209,990 B1 | 12/2015 | Szabo et al. |
| 10,015,090 B2 | 7/2018 | Arad et al. |
| 10,616,111 B1 | 4/2020 | Immidi et al. |
| 10,701,190 B2 | 6/2020 | Kfir et al. |
| 10,757,230 B2 | 8/2020 | Kfir et al. |

(Continued)

OTHER PUBLICATIONS

EP Application #20213217.1 Search Report dated May 4, 2021.

(Continued)

*Primary Examiner* — Robert M Morlan
(74) *Attorney, Agent, or Firm* — Kligler & Associates Patent Attorneys Ltd

(57) ABSTRACT

A parsing apparatus includes an interface, a first parser, a second parser and a controller. The interface is configured to receive packets belonging to a plurality of predefined packet types. The first parser is configured to identify any of the packet types. The second parser is configured to identify only a partial subset of the packet types. The controller is configured to receive a packet via the interface, to attempt identifying a packet type of the received packet using the second parser, and in response to detecting that identifying the packet type using the second parser fails, to revert to identify the packet type of the received packet using the first parser.

20 Claims, 6 Drawing Sheets

(56) References Cited

U.S. PATENT DOCUMENTS

| | | |
|---|---|---|
| 2003/0043848 A1 | 3/2003 | Sonksen |
| 2003/0074388 A1* | 4/2003 | Pham .................. H04L 49/50 709/226 |
| 2004/0081101 A1 | 4/2004 | Bennett |
| 2004/0088430 A1 | 5/2004 | Busi et al. |
| 2004/0218528 A1 | 11/2004 | Shipman |
| 2005/0089016 A1 | 4/2005 | Zhang et al. |
| 2005/0108617 A1 | 5/2005 | Lappin |
| 2006/0062144 A1 | 3/2006 | Testa et al. |
| 2007/0140297 A1* | 6/2007 | Chung ................ H04L 45/302 370/473 |
| 2007/0276952 A1 | 11/2007 | Mitchell |
| 2008/0025308 A1 | 1/2008 | Morgan et al. |
| 2008/0095149 A1 | 4/2008 | Dai |
| 2009/0097418 A1 | 4/2009 | Castillo et al. |
| 2011/0149895 A1 | 6/2011 | Sala et al. |
| 2013/0022128 A1 | 1/2013 | Symes |
| 2013/0128885 A1* | 5/2013 | Kardashov ............ H04L 12/56 370/389 |
| 2013/0215906 A1 | 8/2013 | Hidai |
| 2015/0081726 A1 | 3/2015 | Izenberg |
| 2015/0081833 A1 | 3/2015 | Pettit et al. |
| 2015/0156288 A1 | 6/2015 | Lu et al. |
| 2015/0172189 A1 | 6/2015 | Pitchai et al. |
| 2015/0256456 A1 | 9/2015 | Previdi et al. |
| 2015/0341265 A1 | 11/2015 | Basso et al. |
| 2016/0094667 A1 | 3/2016 | Jani |
| 2016/0139892 A1 | 5/2016 | Atreya et al. |
| 2016/0197852 A1 | 7/2016 | Hutchison et al. |
| 2016/0285759 A1 | 9/2016 | Ryan et al. |
| 2017/0064047 A1 | 3/2017 | Bosshart |
| 2017/0168970 A1 | 6/2017 | Sajeepa et al. |
| 2017/0180253 A1 | 6/2017 | Koren et al. |
| 2017/0286292 A1 | 10/2017 | Levy et al. |
| 2018/0242218 A1 | 8/2018 | Muscariello et al. |
| 2018/0287941 A1 | 10/2018 | Louzoun et al. |
| 2018/0288197 A1 | 10/2018 | Izenberg |
| 2018/0288614 A1 | 10/2018 | Zaks et al. |
| 2019/0004701 A1 | 1/2019 | Guim Bernat et al. |
| 2019/0073719 A1 | 3/2019 | Parsons et al. |
| 2019/0123984 A1 | 4/2019 | Nainar et al. |
| 2019/0132421 A1 | 5/2019 | Fedyak |
| 2019/0140979 A1 | 5/2019 | Levi et al. |
| 2019/0207860 A1 | 7/2019 | York et al. |
| 2020/0293487 A1 | 9/2020 | Anderson et al. |
| 2021/0306257 A1 | 9/2021 | Dutta |

OTHER PUBLICATIONS

Gibb et al., "Design Principles for Packet Parsers", ACM/IEEE Symposium on Architectures for Networking and Communications Systems (ANCS), 12 pages, Oct. 2013.

Deering et al., "Internet Protocol, Version 6 (IPv6) Specification", Request for Comments: 2460, 39 pages, Dec. 1998.

University of Southern California, "Darpa Internet Program", Protocol Specification, Request for comments 791, pp. 1-50, Sep. 1981.

Urman et al., U.S. Appl. No. 16/708,470, filed Dec. 10, 2019.

Cheng et al., "Telco Distributed DC with Transport Protocol Enhancement for 5G Mobile Networks," working paper, Karlstad University, Faculty of Health, Science and Technology, pp. 1-58, Dec. 2017.

Urman et al., U.S. Appl. No. 16/853,783, filed Apr. 21, 2020.

U.S. Appl. No. 16/708,470 Office Action dated Jul. 20, 2021.

U.S. Appl. No. 17/508,998 Office Action dated Jun. 24, 2022.

* cited by examiner

EFFICIENT PARSING TUNED TO PREVALENT PACKET TYPES

FIELD OF THE INVENTION

The present invention relates generally to data communication, and particularly to methods and systems for efficient packet parsing.

BACKGROUND OF THE INVENTION

In various devices and applications, the header part of packets contains information indicative of how the packets should be processed and forwarded.

Methods for parsing are known in the art. For example, U.S. Pat. No. 7,623,468 describes a parsing processor that provides instruction-driven content inspection of network packets at 10-Gbps and above with a parsing engine that executes parsing instructions. A state-graph unit traces state-graph nodes to keyword indications and/or parsing instructions. The parsing instructions can be derived from a high-level application to emulate user-friendly parsing logic. The parsing processor sends parsed packets to a network processor unit for further processing.

As another example, in a paper by Glen Gibb et al. entitled "Design Principles for Packet Parsers," ANCS '13: Proceedings of the ninth ACM/IEEE symposium on Architectures for networking and communications systems, October 2013, Pages 13-24, the authors describe trade-offs in parser design, identify design principles for switch and router designers, and describe a parser generator that outputs synthesizable Verilog that is available for download.

SUMMARY OF THE INVENTION

An embodiment that is described herein provides a parsing apparatus that includes an interface, a first parser, a second parser and a controller. The interface is configured to receive packets belonging to a plurality of predefined packet types. The first parser is configured to identify any of the packet types. The second parser is configured to identify only a partial subset of the packet types. The controller is configured to receive a packet via the interface, to attempt identifying a packet type of the received packet using the second parser, and in response to detecting that identifying the packet type using the second parser fails, to revert to identify the packet type of the received packet using the first parser.

In some embodiments, a first parsing rate of the first parser is lower than a second parsing rate of the second parser. In other embodiments, the controller is configured to enqueue the received packet in a first queue of the first parser and in a second queue of the second parser, and in response to identifying the packet type of the received packet by one of the first and the second parsers, dequeue the received packet from another one of the first and second queues. In yet other embodiments, the controller is configured to, in response to identifying a given packet type using the first parser, update the second parser to support the given packet type in identifying subsequent received packets.

In an embodiment, the controller is configured to evaluate a prevalence of the given packet type among the received packets, an to update the second parser with the given packet type based on the prevalence. In another embodiment, the second parser is configured to check whether a type of the received packet matches a first packet type in the subset, in parallel with checking whether the type of the received packet matches a second different packet type in the subset. In yet another embodiment, the second parser is configured to hold one or more templates, each template specifying one or more header fields corresponding to a respective packet type, and to check whether a header of the received packet matches any of the templates.

In some embodiments, the second parser is configured to produce a partial parsing descriptor, in response to detecting that part of the header matches a corresponding part of a template. In other embodiments, the templates specify respective byte-positions and byte-values of one or more bytes along the header, and the second parser is configured to identify a given packet type corresponding to a given template, in response to detecting that the byte-values in the byte-positions specified in the given template match the byte-values in same respective byte-positions in the header. In yet other embodiments, the second parser includes multiple matching modules, and a given matching module is configured to attempt matching between bytes in the header and corresponding bytes in one or more templates.

There is additionally provided, in accordance with an embodiment that is described herein, a method for parsing, including, in a parsing apparatus, receiving packets belonging to a plurality of predefined packet types, the parsing apparatus includes a first parser that supports identifying any of the packet types, and a second parser that supports identifying only a partial subset of the packet types. A packet is received, and an attempt is made to identify a packet type of the received packet using the second parser. In response to detecting that identifying the packet type using the second parser fails, reverting is made to identifying the packet type of the received packet using the first parser.

The present invention will be more fully understood from the following detailed description of the embodiments thereof, taken together with the drawings in which:

DETAILED DESCRIPTION OF EMBODIMENTS

Overview

Figure 1:
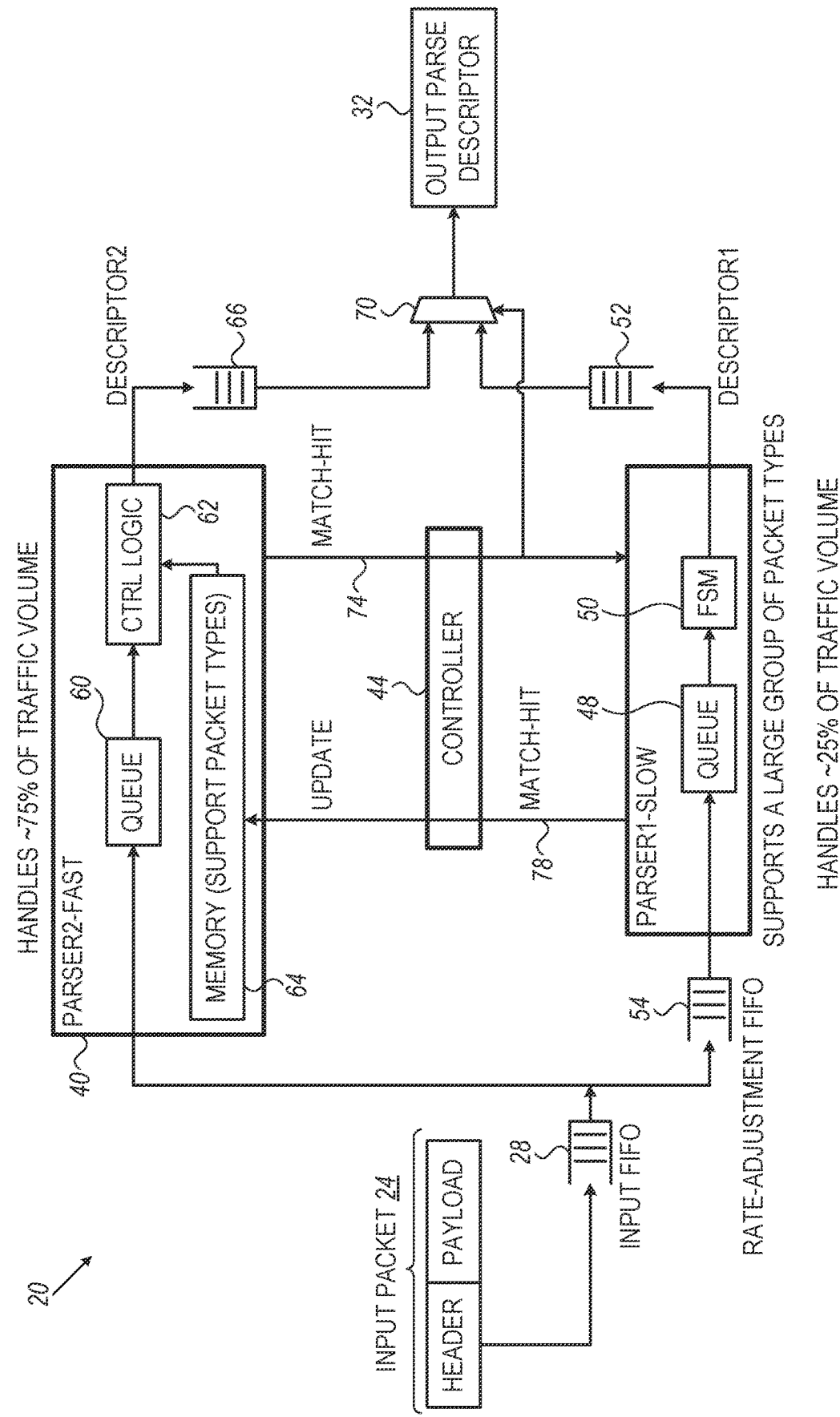
FIG. 1 is a block diagram that schematically illustrates a high-rate parser, in accordance with an embodiment that is described herein.

Embodiments that are described herein provide improved methods and systems for packet parsing.

Various types of network devices and applications perform packet parsing for determining the processing and forwarding required for the packet. Parsing typically involves identification of certain fields in a header of the packet, e.g., fields related to the underlying communication protocols used. In the present context and in the claims the term "packet type" refers to the ordered protocols specified in the packet's header.

In modern devices parsers are typically required to support large variety of packet types. Moreover, increasing bandwidth demands such as in data centers and in High-Performance Computing (EEC) increase parsing rate demands accordingly.

In specifying a packet type, a header field of one protocol typically points to the next field of another protocol. As an example, a packet in an Ethernet network may have a packet type denoted MAC-IPV6 or MAC-IPV4, for example. As another example, a packet encapsulated in a Virtual Local Area Network (VLAN) may have a racket type denoted MAC-VLAN-IPV4-UDP.

A parser supporting a large variety of packet types may identify a packet type by scanning the packet header in accordance with a predefined graph in which the nodes correspond to the supported packet types. Parsers of this sort, however, are typically implemented using a Finite-State Machine (FSM), which is not fast enough to meet parsing rate demands.

In principle, parsing rate could be increased, for example, by assigning multiple parsing-engines to different subsets of the packets belonging to a common packet stream. This solution would typically involve packet reordering before or after parsing. Another approach for increasing the parsing rate could be based on parsing packets on demand, e.g., parse only when a certain field of a packet header is needed. The main disadvantages of the example approaches described above include increased complexity, increased latency and high cost in terms of ASIC area and power consumption.

The packet types of packets traversing a communication network are typically distributed nonuniformly. For example, characteristics of transport protocols used in data centers described, for example, by Jun Cheng & Karl-Johan Grinnemo, in paragraph 4.2 of a survey entitled "Telco Distributed DC with Transport Protocol Enhancement for 5G Mobile Networks," Karlstad University, Faculty of Health, Science and Technology, December, 2017.

The inventors discovered experimentally that traffic in real-life networks may be dominated by only a small subset of the entire packet types supported. For example, a field experiment showed that 99% of the packets in some ports had a MAC-VLAN-IPV6-TCP type. In other ports, 70% of the packets had a MAC-VLAN-IPV6-UDP type (possibly with high-layer protocols that need not be parsed for forwarding), and 30% had a MAC-VLAN-IPV6-TCP type.

In the disclosed embodiments, based on an assumption that traffic is dominated by a small number of packet types, a parsing apparatus comprises first and second parsers as described herein. The first parser has a slow parsing rate but supports any of the packet types in a plurality of predefined packet types. The second parser, on the other hand, has a much faster parsing rate than the first parser but supports only a small partial subset of the packet types at any given time. A controller of the parsing apparatus first attempts parsing a received packet using the second (faster) parser. If parsing using the second parser fails, the controller reverts to parse the packet using the slower but comprehensive first parser. By properly selecting the packet types to be handled the second parser, most of the packets are identified using the second parser. Consequently, the overall, parsing rate increases significantly, compared to parsing using the first parser alone.

In the description that follows, the term "parsing rate" of a parser refers to the average amount of data that the parser can handle per time unit. For example, the parsing rate specifies the average number of packets that are parsed in a time unit. As another example, the parsing rate specifies the average data-rate (e.g., in bits per second) of incoming packets that require parsing.

As described above, the type of each packet is identified by one of the first and second parsers. In some embodiments, the controller enqueues a received packet in a first queue of the first parser and in a second queue of the second parser. In response to identifying the packet type of the packet by one of the first and the second parsers, the controller dequeues the received packet from the other one of the first and second queues.

The subset of packet types supported by the second parser may be modified adaptively. In an embodiment, in response to identifying a given packet type using the first parser, the controller updates the second parser to support the given packet type in identifying subsequent received packets. For example, the controller evaluates a prevalence of the given packet type among the received packets and updates the second parser with the given packet type based on the prevalence.

In some embodiments, for fast parsing, the second parser attempts matching a packet to multiple packet types concurrently. Note, however, that only one of the packet types that are checked concurrently can be matched.

In some embodiments, the second parser holds one or more templates, each template specifying one or more header fields corresponding to a respective packet type. In such embodiments, the controller identifies the packet type by checking whether the packet's header matches any of the templates. In some embodiments, the templates specify respective byte-positions and byte-values of one or more bytes along the header, and the second parser identifies a given packet type corresponding to a given template, in response to detecting that the byte-values in the byte-positions specified in the given template match the byte-values in same respective byte-positions in the header.

In some embodiments, the second parser is implemented using multiple matching modules, and a given matching module is configured to check matching between bytes in the header and corresponding bytes in one or more templates. In some embodiments, the second parser attempts matching the header in chunks. The second parser may switch from one template to another, e.g., depending on already matched chunks. This feature enables the second parser to support a number of packet types larger than the number of matching modules.

In the disclosed techniques, a fast parser is tuned to support packet types that are prevalent in the traffic. Other packet types are handled by a slower parser when necessary. Consequently, the overall parsing rate increases considerably, e.g., by a factor of four or more compared to using a single parser that supports all required packet types. The disclosed parsing apparatus requires relatively small silicon area and low power consumption.

System Description

FIG. 1 is a block diagram that schematically illustrates a high-rate parser 20, in accordance with an embodiment that is described herein.

Parser 20 receives packets 24, e.g., from a communication network, and stores the packets (or only the header part of the packets) in an input FIFO 28. Parser 20 analyzes the headers of the packets in FIFO 28 and produces for each packet a corresponding parse descriptor 32. The parse descriptor may comprise, for example, identified fields in the header that are related to underlying communication protocols. Elements involved in passing the payloads of the packets may reside internally or externally to parser 20. Such elements are omitted from FIG. 1 for clarity.

Parser 20 can be used in any suitable network device or application that parses packets for deciding on packet processing and forwarding, e.g., a network switch, a network router, a network adapter such as a Network Interface Controller (NIC) and the like. Based on the parse descriptor, the network device may further process and forward the packet.

Parser 20 comprises a slow parser 36 denoted PARSER1 and a fast parser 40 denoted PARSER2. PARSER1 supports a large group of predefined packet types. PARSER2, on the other hand, supports only a small subset of the entire packet types supported by PARSER1, but handles packets at a much higher parsing rate than PARSER1. PARSER2 may be implemented, for example, using templates that specify packet types, as will be described in detail below. A controller 44 controls the operation of PARSER1, PARSER2 and other elements of parser 20.

In some embodiments, PARSER1 comprises a queue 48 and a Finite State Machine (FSM) 50. Queue 46 stores a header of a packet to be parsed (or part of the header) received from input FIFO 28. A rate-adjustment FIFO 54 adjusts data flow in the slow PARSER1 to match the data flow through the faster PARSER2. FSM 50 parsers the packet header, e.g., by scanning a graph (not shown) whose nodes specify respective packet types. In the parsing process, PARSER1 produces a parse descriptor denoted DESCRIPTOR1 and queues it in a FIFO 52.

In some embodiments, PARSER2 comprises a queue 60, control logic 62 and a memory 64 that stores information related to the packet types currently supported by PARSER2 Queue 60 stores a header of a packet to be parsed (or part of the header) received from input FIFO 28. Control logic 62 parsers the packet header, by checking whether the header matches any of the currently supported packet types. In the parsing process, PARSER2 produces a parse descriptor denoted DESCRIPTOR2, and queues it in a FIFO 66.

A multiplexer 70 receives both DESCTPTOR1 from FIFO 52 and DESCRIPTOR2 from FIFO 66 and selects one of the descriptors for the output parse descriptor 32. In some embodiments, selecting the descriptor for output depends on the arrival order of DESCTPTOR1 and DESCTPTOR2. In some embodiments, multiplexer 70 outputs DESCRIPTOR2 in response to identifying the packet type by PARSER2 40, and outputs DESCRIPTOR1 in response to identifying the packet type by PARSER1 36.

In some embodiments, to parse a received packet 24 controller 44 first controls PARSER2 to parse the packet. When PARSER2 identifies that the packet's header matches one of the currently supported packet types in memory 64, PARSER2 produces a match-hit indication 74, which causes multiplexer 70 to select DESCRIPTOR2 for output. When PARSER2 detects that the packet's header does not match any of the currently supported packet types in memory 64, controller 44 reverts to parse the packet using PARSER1. In this case, PARSER1 identifies the packet type and produces DESCRIPTOR1, which multiplexer 70 selects for output.

In some embodiments, controller 44 starts parsing a given packet by both PARSER2 and PARSER1 concurrently. When PARSER2 succeeds in identifying the underlying packet type, controller 44 uses the corresponding match-hit indication 74 to stop parsing by PARSER1. In some embodiment, controller 44 enqueues a given packet in queue 48 of PARSER1 and in queue 60 of PARSER2 for parsing by both PARSER1 and PARSER2 concurrently. In response to is the packet type of the given packet by PARSER2 (or PARSER1), the controller dequeues the given packet from queue 48 of PARSER1 (or from queue 60 of PARSER2).

Note that it is advantageous to configure PARSER2 with packet types that are prevalent in the traffic received, because PARSER2 has a faster parsing rate than PARSER1, and will thus succeed in parsing most of the received packets.

In some embodiments, the packet types supported by PARSER2 are configured in memory 64 by some external device. In other embodiments, the supported packet types are updated in memory 64 adaptively by controller 44. In an example embodiment, when PARSER1 identifies a given packet type, PARSER1 produces a match-hit indication 78 which causes controller 44 to (possibly based on additional criteria) updates PARSER2 to include the given packet type in memory 64. Consequently, subsequent packets of the given packet type will be parsed using PARSER2 and not using PARSER1.

Using the adaptive mechanism described above, the set of supported packet types updates depending on the distribution of the packet types that may change over time. This in turn, retains the overall high parsing rate even when the selected dominant packet types change over time.

To demonstrate how the parsing scheme in FIG. 1 improves the parsing rate, let R1 and R2 denote the parsing rates of PARSER1 and PARSER2, respectively, wherein R1<R2. Assuming PARSER1 handles 25% of the traffic volume and PARSER2 handles 75% of the traffic volume, the overall parsing rate is given by $0.25 \cdot R1 + 0.75 \cdot R2$, which is much higher than R1 in case of using PARSER1 alone. For example, for $R2=5 \cdot R1$, the overall parsing rate is given by $4 \cdot R1$, i.e., four times the parsing rate of PARSER1 alone.

Efficient Parsing in Example Network Devices

Figure 2A:
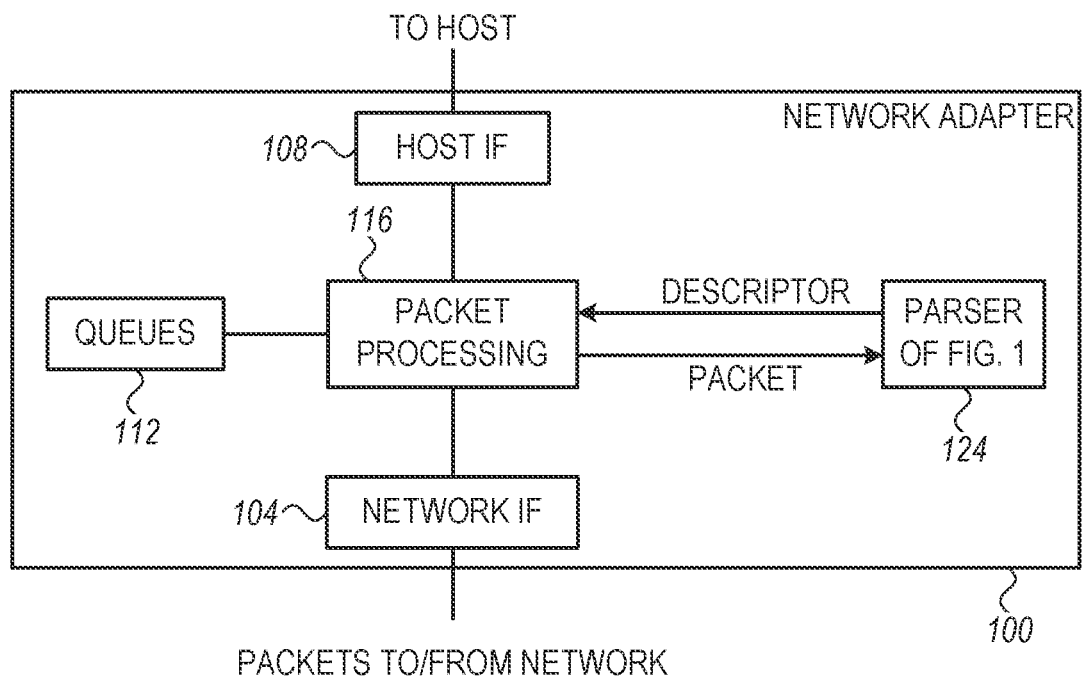
FIGS. 2A and 2B are block diagrams that schematically illustrate a network adapter and a network element using the high-rate parser of FIG. 1, in accordance with embodiments that ate described herein.
Figure 2B:
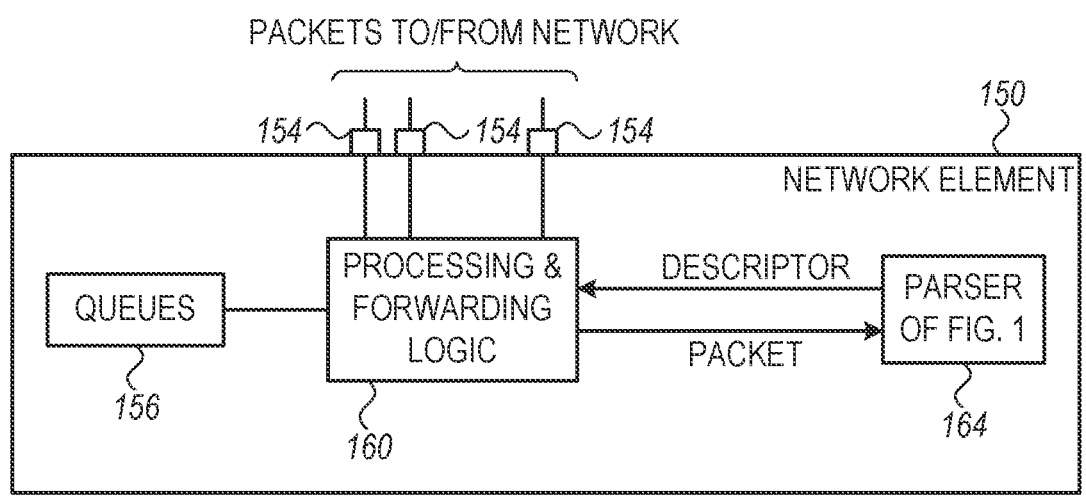

FIGS. 2A and 2B are block diagrams that schematically illustrate a network adapter 100 and a network element 150 using the high-rate parser of FIG. 1, in accordance with embodiments that ate described herein.

Network adapter 100 in FIG. 2A comprises a network interface 104 for connecting to any suitable communication network, and a host interface 108 for connecting to a host processor (not shown). Network adapter 100 may comprise, for example, a Network Interface Controller (NIC). Network adapter 100 stores in queues 112 packets received from the communication network via the network interface and packets received from the host via the host interface. The queued packets await processing by packet processing module 116 that is coupled between the network interface and the host interface, and which is configured to apply various processing to packets received from and transmitted to the communication network.

In determining the processing required for a packet received via network interface 104, the packet processing module sends the packet to a parser 124 of the network adapter. In the present example, parser 124 implements high-rate parser 20 of FIG. 1. Parser 124 parses the packet's header and produces a corresponding parse descriptor specifying the type of the packet. The processing circuitry uses the identified packet type for determining the processing and forwarding to be applied to the packet.

Network element 150 of FIG. 2B comprises multiple ports 154 for connecting to a communication network. Network element 150 further comprises queues 156, and processing and forwarding logic 160. Network element 150 may comprise any suitable element that routes packets in any suitable communication network. The network element may comprise, for example, a network switch or a router.

Queues 156 store packets received from the communication network via ports 154 and packets to be transmitted back to the communication network via the ports. Processing and forwarding logic 160 applies various processing to incoming and outgoing packets.

In determining the processing and forwarding required for a packet received via a port 154, processing and forwarding logic 160 sends the packet to a parser 164 of the network element. In the present example, parser 164 implements high-rate parser 20 of FIG. 1. Parser 164 parses the packet and produces a corresponding parse descriptor specifying the type of the packet. The processing and forwarding logic uses the packet type for determining the processing and forwarding to be applied to the packet.

A Fast Template-Based Parser

Figure 3:
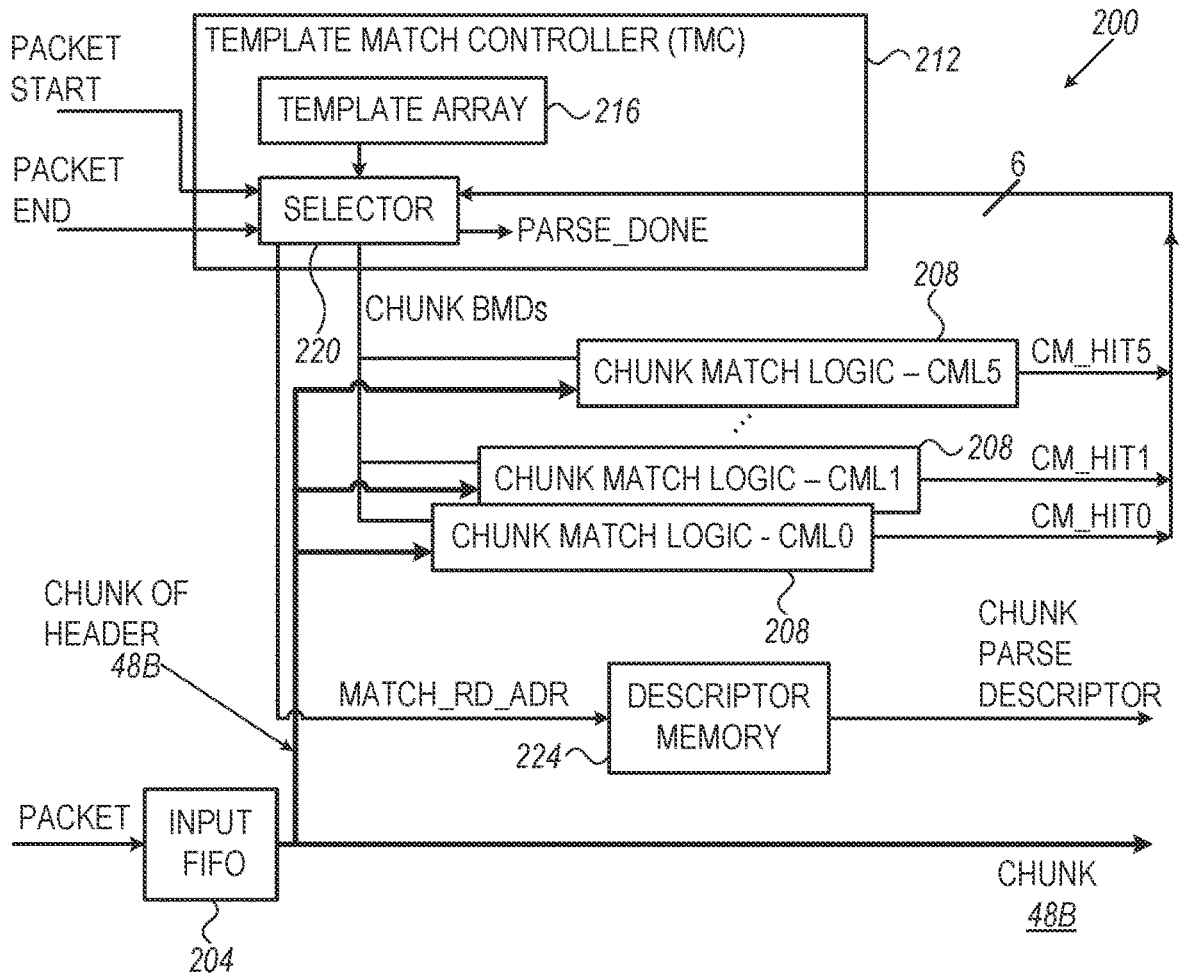
FIG. 3 is a block diagram that schematically illustrates a template-based parser, in accordance with an embodiment that is described herein.

FIG. 3 is a block diagram that schematically illustrates a template-based parser 200, in accordance with an embodiment that is described herein. Parser 200 may be used for implementing PARSER2 40 of FIG. 1 above.

Parser 200 queues incoming packets in a First-In First-Out (FIFO) element 204. Parser 200 attempts matching an incoming packet to one or more predefined templates using Chunk Match Logic (CML) modules 208. In the example of FIG. 3, parser 200 comprises six CML modules 208, denoted CML0...CML5. Alternatively, any other number of CMLs can also be used. The example parser 200 of FIG. 3 attempts matching using up to six CMLs concurrently.

The number of CMLs imposes a tradeoff between parsing rate and complexity. With a larger number of CMLs a higher parsing rate can be achieved but this in turn requires larger ASIC area.

Parser 200 comprises a Template Match Controller (TMC) 212, comprising a template array 216 and a selector 220. In some embodiments, template array 216 is stored in memory 64 and selector 220 in implemented in control logic 62 of FIG. 1.

Template array 216 stores templates specifying packet types. In some embodiments, for a given header size, any packet type of interest can be identified using only a partial subset of the header bytes. For example, in some embodiments, any packet type of interest can be identified by matching only up to 30 bytes in a header of 512 bytes. In some embodiments, parser 200 performs template matching in data chunks that are each smaller than the header size. In the example of parser 200, template matching is carried out in chunks of 48 Bytes.

In some embodiments, for a given chunk, selector 220 selects for each CML that participates in the template matching, template information specifying the bytes in that chunk to be matched. The information specifies, for example, the byte values and positions within the current chunk. The information for each byte may be specified in the form of a data structure referred to herein as a Byte Matching Data (BMD), as will be described below.

Selector 220 also receives inputs denoted "PACKET START" and "PACKET END" in the figure. These inputs are used for resetting the template-based parser, so that in handling a subsequent packet, relevant BDMs related to the beginning of the packet will be loaded.

When the $j^{th}$ CML detects a match between the current chunk data and corresponding bytes of a template, this CML outputs a hit indication, denoted CM_HITj. A full matching between the header and template is detected when all the chunks of the header that contain bytes for matching produce a hit indication. In some embodiments, selector 220 selects a first template in template array 216 for one or more chunks, and then switches to a different second template in the template array. This feature allows parser 200 to identify a number of packet types larger than the number of CMLs.

Parser 200 comprises a descriptor memory 224 that stores predefined chunk-based parse descriptor data. Based on the match hit indications (CM_HIT0 ... CM_HIT5) received from the CMLs, selector 220 produces an address denoted MATCH_RD_ADR for selecting the relevant parse descriptor data for the current chunk. Note that using a descriptor memory is not mandatory and in alternative embodiments other suitable methods for producing parse descriptor data can also be used.

Methods For Template Matching

Figure 4:
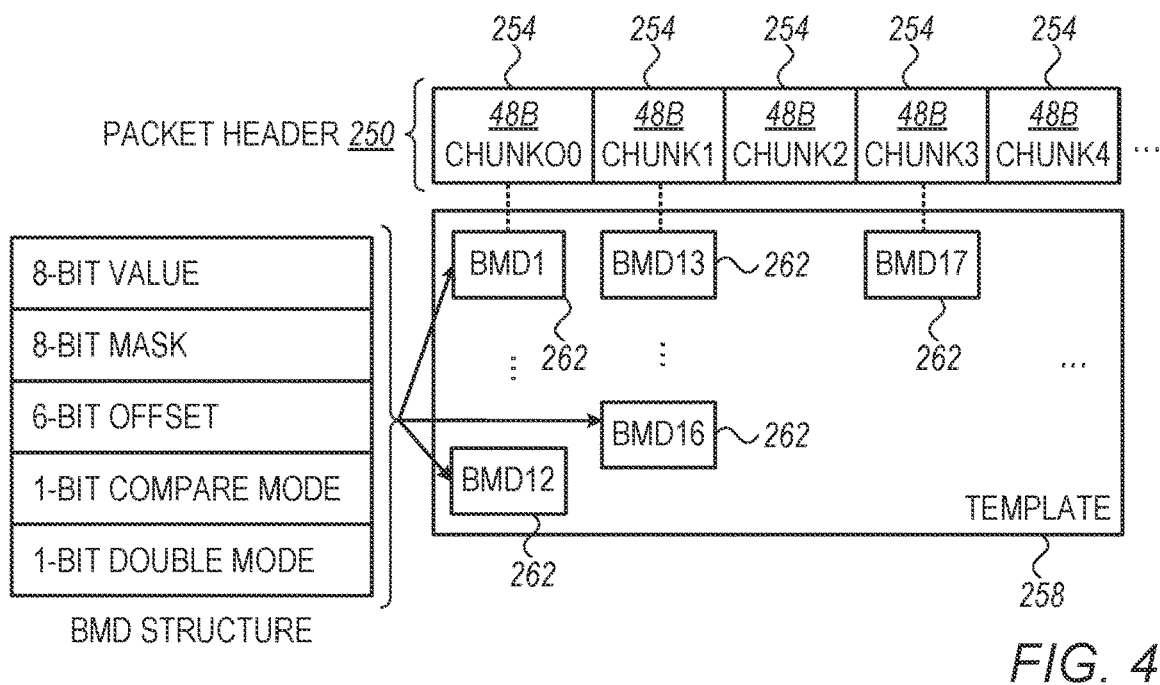
FIG. 4 is a diagram that schematically illustrates a method for template matching in the template-based parser of FIG. 3, in accordance with an embodiment that is described herein.

FIG. 4 is a diagram that schematically illustrates a method for template matching in template-based parser 200 of FIG. 3, in accordance with an embodiment that is described herein.

FIG. 4 depicts a packet header 250 divided into multiple chunks 254. In this example each chunk comprises 48 Bytes. Alternatively, other suitable chunk sizes and/or chunks of different sizes can also be used. In FIG. 4 only the first five chunks denoted CHUNK0 ... CHUNK4 are shown.

A template 258 comprises multiple Byte Matching Data units (BMDs) 262. In some embodiments, a BMD specifies template data for matching a single byte in the packet header. In the present example, BMD 262 may be implemented using a data structure comprising the following elements: an 8-bit VALUE, an 8-bit MASK for selecting one or more bits for matching within a byte, a 6-bit OFFSET within the chunk, a 1-bit COMPARE MODE for selecting between match or nonmatch modes, and a 1-bit DOUBLE mode for matching a 16-bit field.

In the example of FIG. 4, template 258 comprises 17 BMDs denoted BMD1 ... BMD17 for matching 17 template bytes to 17 bytes in header 250. For example, matching to CHUNK0 of the header requires matching 12 bytes of the chunk to 12 template bytes specified in BMD1 ... BMD12. Similarly, matching to CHUNK1 requires matching to four template bytes specified in BMD13 ... BMD16, and matching to CHUNK3 requires matching to a single template byte specified in BMD17.

Methods For High-Rate Parsing

Figure 5:
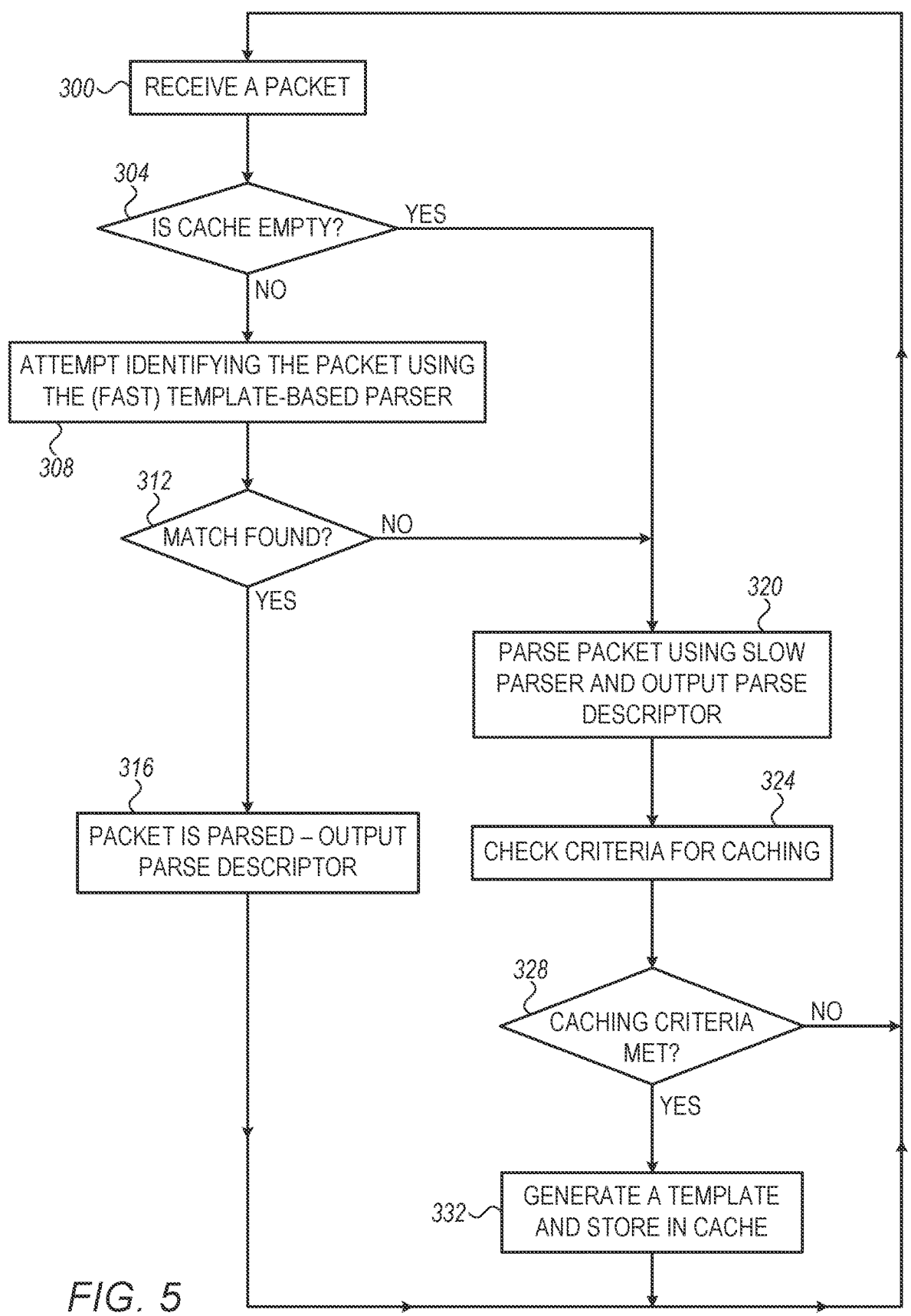
FIG. 5 is a flow chart that schematically illustrates a method for high-rate parsing, in accordance with an embodiment that is described herein.

FIG. 5 is a flow chart that schematically illustrates a method for high-rate parsing, in accordance with an embodiment that is described herein.

The method is described as executed by parser 20 of FIG. 1. In the present example, although not mandatory, PARSER2 comprises the template-based parser of FIG. 3. It is further assumed that template array 216 is stored in memory 64 and that selector 220 in implemented in control logic 62 of FIG. 1.

In describing the method of FIG. 5 it is assumed that template array 216 in memory 64 caches the currently supported templates for fast parsing. This means that initially the template array is empty and that templates corresponding to packet types identified by PARSER1 may be cached in the template array, e.g., if these packet types are prevalent in the traffic.

The method begins with parser 20 receiving a packet, at a reception step 300. At a cache query step 304, parser 20 checks whether template array 216 is empty or has one or more cached templates. When the template array is not empty, parser 20 attempts identifying the received packet by attempting to match the packet's header to the currently cached templates, at a matching step 308. At a match query step 312, parser 20 checks whether the template-based parser has found a template that matches the packet's header, and if so, the packet has been successfully parsed and parser 20 outputs a corresponding parse descriptor at an output step 316. Following step 316, parser 20 loops back to step 300 to receive another packet.

When at step 304 no templates are currently cached, or when at step 312 no matching template was found, parser 20 proceeds to a full parsing step 320. St step 320 parser 20 identifies the type of the received packet using PARSER1 36, and outputs a corresponding parse descriptor.

At a criteria evaluation step 324, parser 20 checks whether a template corresponding to the packet type identified by PARSER1 should be cached in template array 216. At step 324 various criteria can be used For example, a criterion for caching may be based on monitoring the prevalence of the packet type corresponding to the matching template among the received packets. Determining the prevalence of a given packet type may be carried out by calculating the percentage of packets having the given packet type among multiple received packets. Such a criterion (and other criteria) may be applied, for example, to packets received within a recent time period. When the template array is full, one of the cached templates should be evicted, e.g., a template that was least recently used. Alternatively, other suitable eviction methods can also be used.

At a caching query step 328, parser 20 checks whether the criteria at step 324 are met, and if not, loops back to step 300 to receive another packet. Otherwise, parser 20 generates a template corresponding to the packet type detected at step 320 and caches the template in template array 216, at a caching step 332. Following step 332, parser 20 loops back to step 300 to receive another packet. In some embodiments, the template to be cached is generated during parsing by PARSER1 and is therefore ready for caching at step 332.

Detailed Embodiments of A Template-Based Parser

Figure 6:
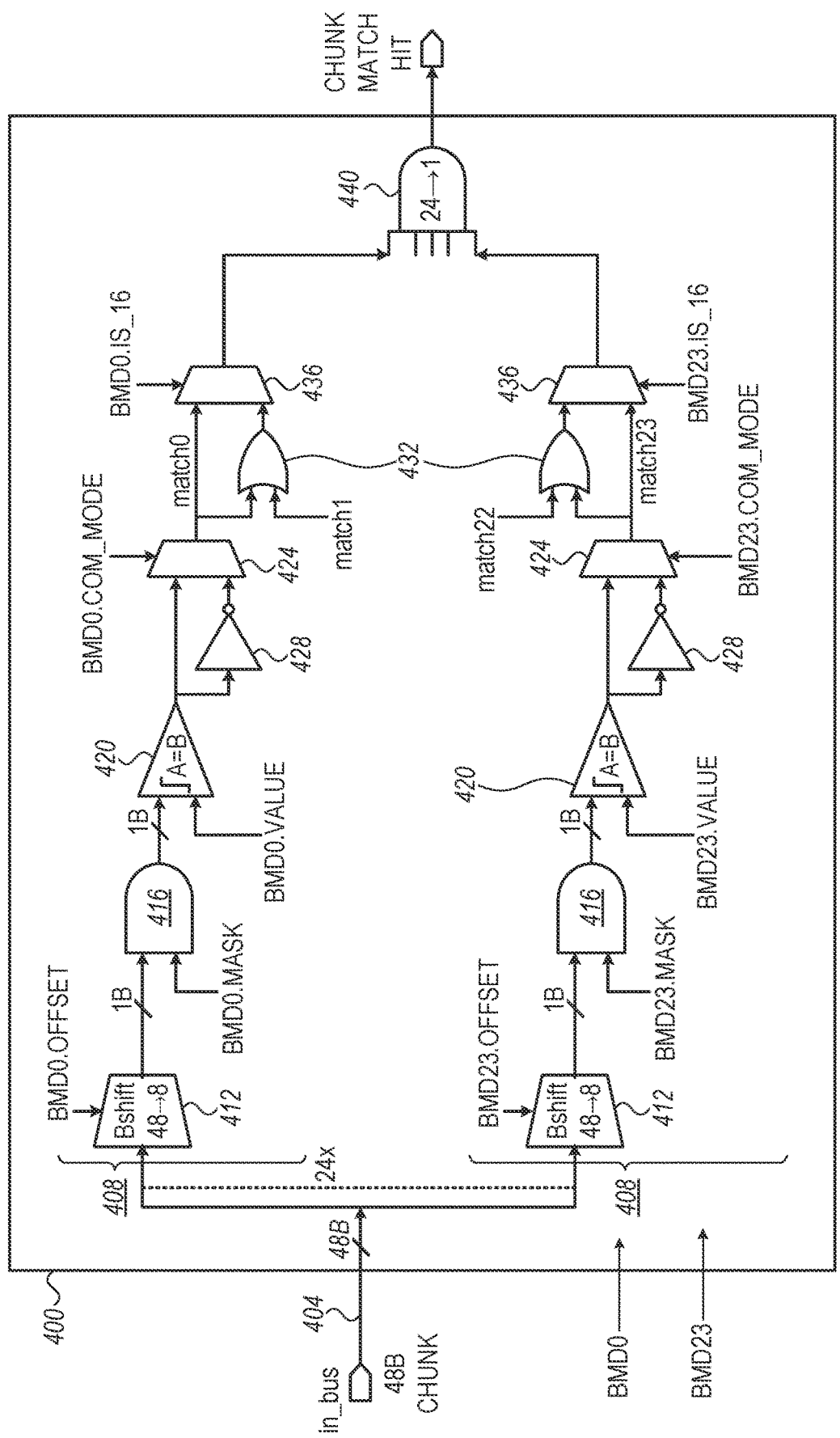
FIG. 6 is a block diagram that schematically illustrates Chunk Matching Logic (CML), in accordance with an embodiment that is described herein.

FIG. 6 is block diagram that schematically illustrates a Chunk Matching Logic (CML) 400, in accordance with an embodiment that is described herein.

The CML of FIG. 6 can be used, for example, in implementing CMLs 208 of parser 200 in FIG. 3.

CML 400 receives a chunk of a packet header (e.g., from input FIFO 204 of FIG. 3) via an input bus 404 and provides the chunk to multiple matching branches 408 concurrently. In the present example the chunks have a common size of 48 bytes. CML 400 further receives (e.g., from template array 216) multiple BMDs denoted BMD0 . . . BMD23 and provides the BMDs to respective branches 408. In the present example, CML 400 provides 24 BMDs denoted BMD0 . . . BMD23 to respective 24 matching branches 408.

Branch 408 comprises a barrel shifter 412 that shifts the 48B chunk cyclically in accordance with the OFFSET specified in the BMD, for extracting the relevant byte in the chunk. A logical AND gate 416 applies to the extracted byte a MASK specified in the BMD to produce a masked value, and a comparator 420 compares between the masked value a byte VALUE specified in the BMD. A multiplexer 424 selects the comparator output or the comparator output negated using a logical NOT gate 428, based on the comparator mode (denoted COM_MODE) specified in the BMD. A logical OR gate 432 and a multiplexer 436 support non-matching of a single byte or two bytes. A logical AND gate 432 receives the matching results of the individual branches, and outputs a combined match hit indication when all the bytes of the template match. Note that a template may use less than 24 BMDs for chunk matching, in which case only part of matching branches 408 are used.

Figure 7:
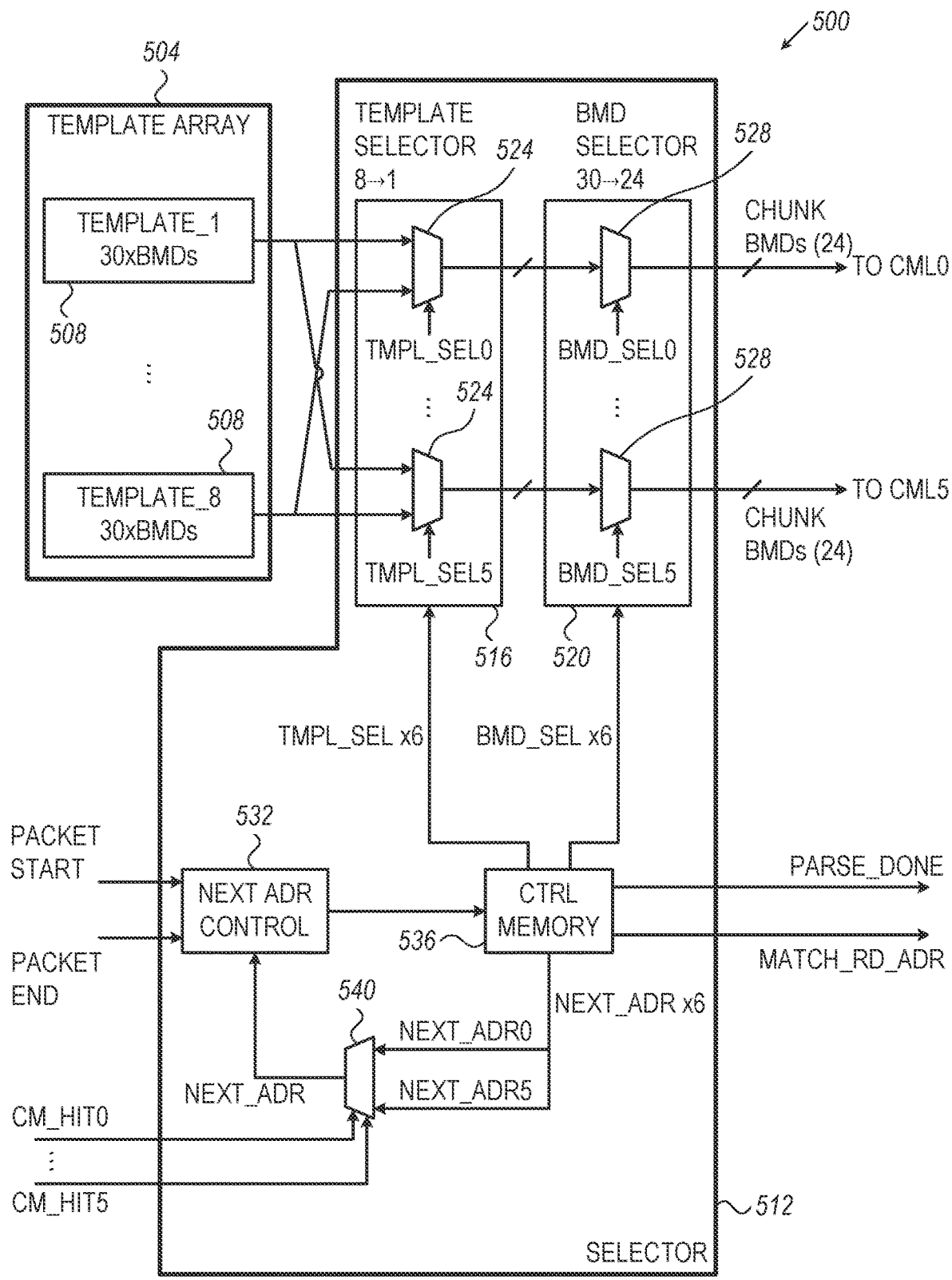
FIG. 7 is a block diagram that schematically illustrates a template match controller, in accordance with an embodiment that is descried herein.

FIG. 7 is a block diagram that schematically illustrates a Template Match Controller (TMC) 500, in accordance with an embodiment that is descried herein.

TMC 500 may be used, for example, in implementing TMC 212 of FIG. 3 above.

TMC 500 comprises a template array 504 comprising multiple templates 508, each of which comprising one or more BMDs. Template array 504 may be used in implementing template array 216 of FIG. 3 and may be stored in memory 64 of FIG. 1. An example template 258 comprising BMDs 262 is described with reference to FIG. 2 above. In the present example, the template array comprises eight templates denoted TEMPLATE_1 . . . TEMPLATE_8, each of which comprising up to 30 BMDs. In alternative embodiments, any other number of templates and any other suitable maximal number of BMDs per template can also be used.

TMC 500 further comprises a selector 512 that selects up to 24 BMDs per chunk for CML0 . . . CML5. Selector 512 may be used in implementing selector 220 of FIG. 3. In the present example, selector 512 selects BMDs using a two-phase selection scheme. Specifically, a template selector 516 selects for each CML one of templates 508, and a BMD selector 520 selects up to 24 BMDs of the selected template. In the present example, template selector 516 is implemented using 8->1 multiplexers 524, controlled by signals denoted TMPL_SEL0 . . . TMPL_SEL5. BMD selector 520 is implemented using 30->24 multiplexers 528, controlled by signals denoted BMD_SEL0 . . . BMD_SEL5.

Selector 512 further comprises a next address controller 532, a control memory 536 and a multiplexer 540. Control memory 536 receives an address from next address controller 532. Control memory 536 is preprogramed to output selection signals TMPL_SEL0 . . . TMPL_SEL5 to template selector 516 and selection signals BMD_SEL0 . . . BMD_SEL5 to BMD selector 520, based on addresses received from the next address controller. Control memory 536 also produces a PARSE_DONE signal indicative of successful parsing of the current packet, and a MATCH_RD_ADR signal for producing a parse descriptor as described above.

Control memory 536 further outputs signals denoted NEXT_ADR0 . . . NEXT_ADR5 to multiplexer 540 that selects one of them depending on match hit signals CM_HIT0 . . . CM_HIT5 produced by respective CML0 . . . CML5. Based on the NEXT_ADR signal selected by multiplexer 540, next address controller 532 determines the next address for control memory 536.

In some embodiments, the matching scheme in FIG. 7 supports matching a given packet type using a single template 508. In other embodiments, the matching scheme in FIG. 7 supports matching a given packet type using multiple templates 508, e.g., by switching from one template to another at selected chunks. This flexibility allows matching a number of templates larger than the number of available CMLs. For example, as will be described below, two or more packet types may initially share one or more common protocols, but later split into different protocols.

Assume an embodiment in which PARSER2 of FIG. 1 is implemented using template-based parser 200 of FIG. 3, wherein TMC 212 of FIG. 3 is implemented using TMC 500 of FIG. 7. Further assume that CML0 . . . CML5 are configured to match different respective packet types. Note that when one of the CMLs (e.g., CML0) succeeds matching based on the first 48B chunk, there is no need to continue matching other templates that failed matching in the first 48B chunk. Instead, in the present example, one of CML0 and CML1 can be configured to match relevant sub packet types. For example, a packet type (MAC+IPV6) may have sub packet types (TCP) and (UDP).

In some embodiments, when a match occurs in one of the CMLs, this CML controls of the templates (e.g., BMDs) that will be selected for matching by CML0 . . . CML5 in the next chunk.

The parser configurations shown in FIGS. 1, 3, 6 and 7, and the configurations of network adapter in FIG. 2A and network node in FIG. 2B are example configurations, which are chosen purely for the sake of conceptual clarity. In alternative embodiments, any other suitable parser, network adapter and network node configurations can also be used. Elements that are not necessary for understanding the principles of the present invention, such as various interfaces, addressing circuits, timing and sequencing circuits and debugging circuits, have been omitted from the figure for clarity.

Some elements of parser 20 of FIG. 1, such as PARSER1 36, PARSER2 40 and controller 44, elements of network adapter 100, such as packet processing nodule 116, and elements of network element 150, such as processing and forwarding module 160 may be implemented in hardware, e.g., in one or more Application-Specific Integrated Circuits (ASICs) or FPGAs. Additionally or alternatively, PARSER1 36, PARSER2 40, controller 44, packet processing module 116 and processing and forwarding module 160 can be implemented using software, or using a combination of hardware and software elements. Memory 64 may comprise any suitable type of memory using any suitable storage technology such as a Random Access Memory (RAM), a Dynamic RAM (DRAM), a nonvolatile memory such as a Flash memory, or a combination of multiple memory types.

In some embodiments, some of the functions of parser 20, network adapter 100 and network element 150, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The embodiments described above ae given by way of example, and other suitable embodiments can also be used.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference is the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A parsing apparatus, comprising:
an interface, configured to receive packets belonging to a plurality of predefined packet types;
a first parser, configured to identify any of the packet types;
a second parser configured to identify only a partial subset of the packet types; and
a controller configured to:
receive a packet via the interface;
attempt identifying a packet type of the received packet using the second parser; and
in response to detecting that identifying the packet type using the second parser fails, revert to identify the packet type of the received packet using the first parser.

2. The parsing apparatus according to claim 1, wherein a first parsing rate of the first parser is lower than a second parsing rate of the second parser.

3. The parsing apparatus according to claim 1, wherein the controller is configured to enqueue the received packet in a first queue of the first parser and in a second queue of the second parser, and wherein in response to identifying the packet type of the received packet one of the first and the second parsers, dequeue the received packet from another one of the first and second queues.

4. The parsing apparatus according to claim 1, wherein the controller is configured to, in response to identifying a given packet type using the first parser, update the second parser to support the given packet type in identifying subsequent received packets.

5. The parsing apparatus according to claim 4, wherein the controller is configured to evaluate a prevalence of the given packet type among the received packets, and to update the second parser with the given packet type based on the prevalence.

6. The parsing apparatus according to claim 1, wherein the second parser is configured to check whether a type of the received packet matches a first packet type in the subset, in parallel with checking whether the type of the received packet matches a second different packet type in the subset.

7. The parsing apparatus according to claim 1, wherein the second parser is configured to hold one or more templates, each template specifying one or more header fields corresponding to a respective packet type, and to check whether a header of the received packet matches any of the templates.

8. The parsing apparatus according to claim 7, wherein the second parser is configured to produce a partial parsing descriptor, in response to detecting that part of the header matches a corresponding part of a template.

9. The parsing apparatus according to claim 7, wherein the templates specify respective byte-positions and byte-values of one or more bytes along the header, and wherein the second parser is configured to identify a given packet type corresponding to a given template, in response to detecting that the byte-values in the byte-positions specified in the given template match the byte-values in same respective byte-positions in the header.

10. The parsing apparatus according to claim 7, wherein the second parser comprises multiple matching modules, and wherein a given matching module is configured to attempt matching between bytes in the header and corresponding bytes in one or more templates.

11. A method for parsing, comprising:
in a parsing apparatus, receiving packets belonging to a plurality of predefined packet types, wherein the parsing apparatus comprises a first parser that supports identifying any of the packet types, and a second parser that supports identifying only a partial subset of the packet types;
receiving a packet, and attempting to identify a packet type of the received packet using the second parser; and
in response to detecting that identifying the packet type using the second parser fails, reverting to identifying the packet type of the received packet using the first parser.

12. The method according to claim 11, wherein a first parsing rate of the first parser is lower than a second parsing rate of the second parser.

13. The method according to claim 11, wherein receiving the packet comprises enqueueing the received packet in a first queue of the first parser and in a second queue of the second parser, and comprising, in response to identifying The packet type of the received packet by one of the first and the second parsers, dequeuing the received packet from another one of the first and second queues.

14. The method according to claim 11, and comprising, in response to identifying a given packet type using the first parser, updating the second parser to support the given packet type in identifying subsequent received packets.

15. The method according to claim 14, and comprising evaluating a prevalence of the given packet type among the received packets, and updating the second parser with the given packet type based on the prevalence.

16. The method according to claim 11, and comprising checking by the second parser whether a type of the received packet matches a first packet type in the subset, in parallel with checking by the second parser whether the type of the received packet matches a second different packet type in the subset.

17. The method according to claim 11, wherein the second parser holds one or more templates, each template specifying one or more header fields corresponding to a respective packet type, and comprising checking whether a header of the received packet matches any of the templates.

18. The method according to claim 17, and comprising producing by the second parser a partial parsing descriptor, in response to detecting that part of the header matches a corresponding part of a template.

19. The method according to claim 17, wherein the templates specify respective byte-positions and byte-values of one or more bytes along the header, and comprising identifying by the second parser a given packet type corresponding to a given template, in response to detecting that the byte-values in the byte-positions specified in the given template match the byte-values in same respective byte-positions in the header.

20. The method according to claim 17, wherein the second parser comprises multiple matching modules, and wherein checking whether the header of the received packet matches any of the templates comprises attempting matching, by a given matching module, between bytes in the header and corresponding bytes in one or more templates.

* * * * *